Feb. 10, 1959  C. W. BENTZ  2,872,771
NON-CHOKE MOWER GUARD SHOE

Filed April 29, 1955  2 Sheets-Sheet 1

INVENTOR.
CARLOS W. BENTZ
BY
RICHEY, WATTS, EDGERTON & McNENNY
N. F. McNenny
ATTORNEYS

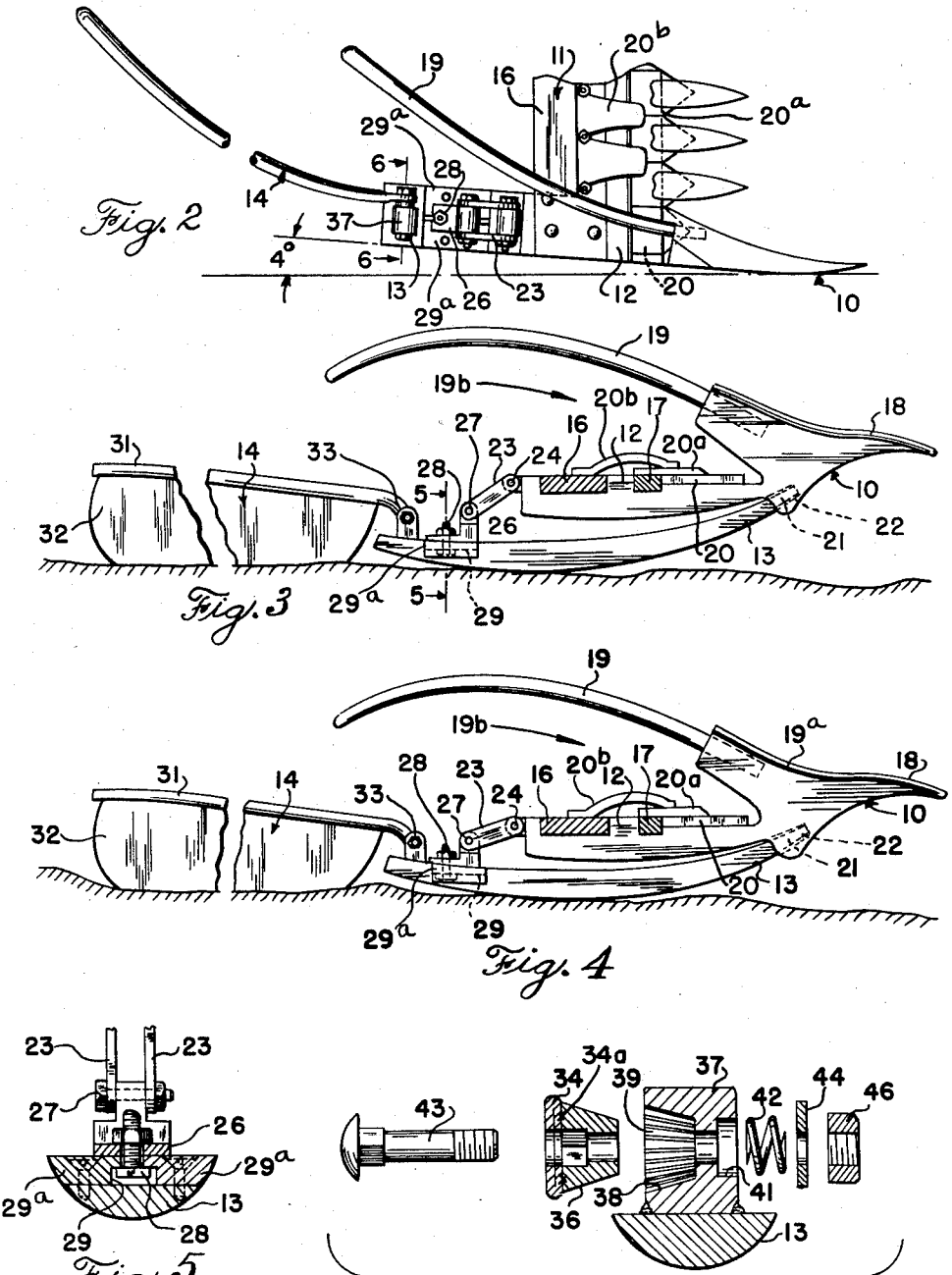

United States Patent Office 2,872,771
Patented Feb. 10, 1959

2,872,771

NON-CHOKE MOWER GUARD SHOE

Carlos W. Bentz, Deadwood, S. Dak.

Application April 29, 1955, Serial No. 504,949

5 Claims. (Cl. 56—314)

This invention relates to mowing machines in general and more particularly to the out-board shoe and guard for mowing machines used in conjunction with tractors and the like. Reference is made to my application Serial No. 414,032, now abandoned, filed March 4, 1954, of which this is a continuation in part.

It is an important object of this invention to provide an outer or out-board shoe and guard for mowing machines which is capable of mowing all types of grasses without clogging.

It is another object of this invention to provide an out-board shoe and guard structure for a mowing machine which is easily maintained and adjusted.

It is still another object of this invention to provide an out-board shoe and guard for a mowing machine which provides for smooth flow of the grass being cut so that clogging and bunching of the grass is eliminated.

Further objects and advantages will appear from the following description and drawings, wherein:

Fig. 2 is a plan view of the outer end of the sickle bar of the mowing machine showing the out-board shoe according to this invention;

Fig. 3 is an enlarged side elevation of the out-board shoe according to this invention adjusted so as to provide a high cut;

Fig. 4 is an enlarged side elevation similar to Fig. 2 but showing the position of the elements when the shoe is adjusted for a cut closer to the ground;

Fig. 5 is an enlarged cross-sectional view taken along 5—5 of Fig. 3; and

Fig. 6 is an enlarged exploded cross-section of the structure for attaching the grassboard or swathboard to the sole of the shoe assembly.

Figure 1:
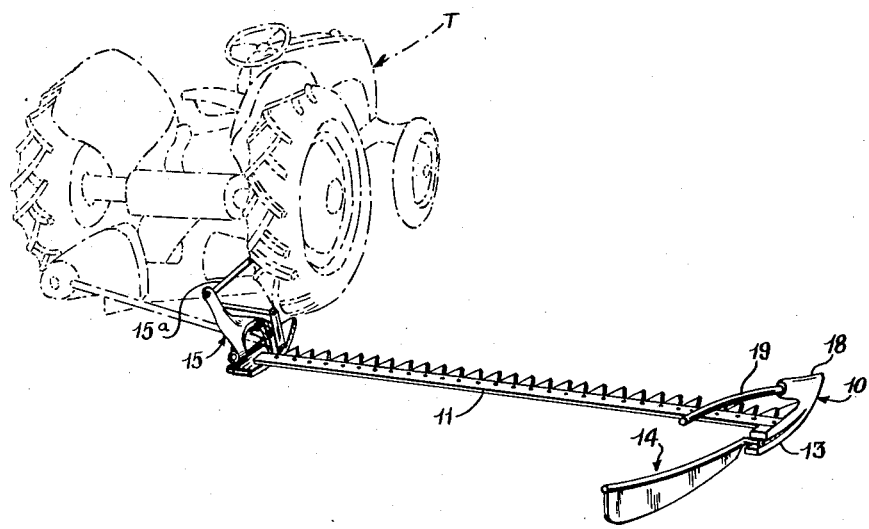
Fig. 1 is a reduced perspective view of a mower according to this invention attached to a tractor.

The outer shoe and guard assembly, according to this invention, comprises an outer shoe formed with a grass-dividing portion and a dividing bar, the shoe being mounted on a sole. The mounting of the shoe and sole provides for relative adjustment to raise and lower the shoe relative to the ground to provide for changing of the height of the shoe and, in turn, the height of the cut. A swathboard or grassboard is pivotally mounted on the rearward end of the sole in such a way as to insure proper sweeping of the cut grass. The various elements are arranged so that smooth flow of the grass over the outer shoe is provided to eliminate possibilities of clogging and the like and to insure that the cut grass will be cleanly separated from the standing grass.

For a clear understanding of this invention reference should be made to the drawings wherein the out-board assembly 10 is mounted on the sickle bar assembly 11 at the end of the sickle bar remote from the tractor T. The outer shoe assembly 10 includes three basic subassemblies, or units, the shoe assembly and guard 12, the sole 13 and the grassboard 14.

The shoe 12 is firmly attached to the guard bar 16 at the outer end thereof and provides a groove in which the sickle bar 17 reciprocates. A ledger plate 20 is mounted on the shoe which cooperates with one of the blades 20ª to cut the end of the sweep. The hold-down members 20ᵇ insure proper pressing of the blades against the ledger plates. The sickle bar assembly is mounted on the tractor by the mounting assembly 15. In normal operation, the sickle bar assembly is maintained in a horizontal position so the plane of the out-board shoe 12 is in turn maintained horizontal. The out-board shoe 12 is provided with grass-divider portion 18 which extends forward from the shoe and divides the grass to be cut from the grass which is to remain standing. The divider bar 19 is connected to the portion 19a extending rearwardly from the forward end portion 18 of the shoe 12 and projects back above the sickle. This divider bar 19 is also curved inwardly toward the sickle and is arranged so that the grass being cut is turned in relative to the outer shoe to insure separation and smooth flow of the grass cut during the cutting operation.

The sole 13 is mounted on the out-board shoe assembly and is provided with a front end portion 21 which projects into an aperture 22 formed in the lower side of the shoe assembly. A shackle 23 provides a connection between the back end of the shoe 12 and the sole 13. The shackle 23 is secured to the shoe 12 as at pivot bolt 24 and to a shackle bracket 26 as at pivot bolt 27. A bolt 28 extends through the shackle bracket into longitudinal slot 29 formed by metal fillers 29ª secured to sole 13. It is apparent that by loosening bolt 28 and pivot bolts 24 and 27 shackle bracket 26 can be moved longitudinally of the sole 13, thus allowing for the adjustment of shoe 12 in relationship to sole 13. When the desired relationship between the shoe and the sole is obtained, bolts 24, 27 and 28 are tightened to maintain the desired relationship. Figs. 3 and 4 disclose two relative positions of the shoe and sole.

The grassboard 14 is comprised of a curved pipe 31 and the board proper 32 mounted thereon. The pipe 31 is pivotally attached to the sole 13 as at 33. For the details of this structure, reference should be made to the exploded view Fig. 6. The pipe 31 is flattened at the forward end 34 and is welded as at 34ª to the pivot member 36. The pivot member 36 is generally conical in shape but is provided with a plurality of flats. The mounting member 37 is mounted on the rearward end of the sole 13 and is provided with a generally conical recess 38 adapted to receive the pivot member 36. This recess 38 is provided with a plurality of flats 39 which cooperate with the flats on the pivot member and resist rotation of the mounting member 37. A spring cavity 41 is also formed in the mounting member 37 on the side opposite from the recess 38 and is adapted to receive the spring 42. A bolt 43, a washer 44, and a nut 46 are arranged so that the pivot member 36 is securely held in the recess 38 by the forces of compression on the spring 42 by the nut 46. It is apparent that the flats formed on the recess 38 and the pivot 36 form a ratchet action between the two members so that rotational movement of the pivot member 36 relative to the mounting member 37 is prevented in normal operation. However, the spring gives a resilient mounting so that when excessive forces are present, it is possible for the two members to rotate relative to each other.

The sole 13 and the grassboard 14 in normal operation ride along the surface of the ground as a unit. If the sole 13 is rotated clockwise in aperture 22 from the position shown in Fig. 3 to the position shown in Fig. 4, the forward end portion 21 of the sole 13 will assume a position closer to the ground. This, in turn, lowers the shoe 12. In order that the sole be so rotated, it is necessary to have bolts 24, 27 and 28 loosened so that shackle 23 and shackle bracket 26 can be positioned accordingly. After the adjustment is made, the bolts 24, 27 and 28 are tightened, thus securing the relationship between the shoe, shackle bracket and sole.

It is to be noted that there is no vertical projection above the plane of the cutting to the rear of the cutting area. Reference to Figs. 2 and 3 shows that the grassboard is pivoted at a point below the plane of cutting to eliminate any such projections. Additionally, the shoe 12 and sole 13 are arranged to underlie and support the sickle bar, and this lower portion is spaced in a vertical direction from an upper portion comprising bar 19 and portion 19a, thus providing a rearwardly open air gap 19b between the upper and lower portions at all points to the rear of the cutting area. This arrangement facilitates the free flow of grass from the cutting area through the air gap. When it is necessary to back or swing the out-board shoe and guard through the cut grass when turning a corner or the like during a mowing operation, the open space between the shoe 12 and bar 19 prevents clogging, for any grass that is located within the open spacing upon backing or turning is swept rearward without obstruction when the mowing operation resumes its forward direction. This open portion behind the forward portion and the cutting area eliminates the tendency to catch or bunch grass and thereby clog the sickle which existed in prior constructions. Thus the shoe assembly of the present invention moves through all types of grasses without difficulty.

In the preferred form, the outside of the out-board assembly 10 is provided with a straight surface free from projections which might catch or tangle the grass and the inside surface is smooth so that grass passing over the shoe will not bunch. An inspection of Fig. 1 will show that there are no projecting surfaces on either side of the shoe assemblies which could in any way catch and bunch grass. This construction of the shoe assembly with the outside straight and the inside curved reduces any tendency to bunch and catch because there is no lateral movement of the standing grass. Only the cut grass is moved laterally and this does not cause difficulty since the cut grass is free for such movement.

In the preferred structure of this invention, the outboard shoe assembly 10 is mounted on the guard bar 16 so that the outside of the assembly 10 is displaced approximately 4° from the right angle position. This results in the positioning of divider portion 18 so that its forward end is at the furthest point from the tractor and the remaining portion of the shoe assembly is displaced slightly away from the standing grass. Those skilled in the art will realize that such a structure will even further reduce clogging.

Although a preferred embodiment of this invention is illustrated it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A shoe assembly for a mowing machine comprising a shoe provided with a forward end portion extending ahead of the assembly to divide the grass to be cut from the standing grass and a dividing bar extending back from said forward end portion for turning the grass to be cut away from the standing grass, sickle means mounted on said shoe for cutting the grass, a sole provided with a forward end portion slidably attached to said shoe, connecting means connecting the rearward end of the shoe and said sole at a point spaced from the forward end thereof, said connecting means providing vertical adjustment of said shoe relative to said sole, and a grassboard adjustably pivoted to the rearward end of said sole, said dividing bar being spaced vertically above said shoe assembly and defining with said shoe assembly a rearwardly open air gap above and extending rearwardly from said sickle means.

2. A shoe assembly for a mowing machine comprising a shoe, sickle means mounted on said shoe for cutting the grass, a sole provided with a forward end portion slidably attached to said shoe, a shackle adjustably connecting the rearward end of the shoe and said sole at a point spaced from the forward end thereof, said shackle being adjustable longitudinally relative to said sole, and a grassboard adjustably pivoted to the rearward end of said sole.

3. A shoe assembly for a mowing machine comprising a shoe provided with a forward end portion extending ahead of the assembly to divide the grass to be cut from the standing grass and a dividing bar extending back from said forward end portion for turning the grass to be cut away from the standing grass, sickle means mounted on said shoe for cutting the grass, a sole provided with a forward end portion slidably attached to said shoe, a shackle adjustably connecting the rearward end of the shoe and said sole at a point spaced from the forward end thereof, said shackle being adjustable longitudinally relative to said sole, and a grassboard adjustably pivoted to the rearward end of said sole.

4. A shoe assembly for a mowing machine comprising a shoe provided with a forward end portion extending ahead of the assembly to divide the grass to be cut from the standing grass and a dividing bar extending back from said forward end portion for turning the grass to be cut away from the standing grass, sickle means mounted on said shoe for cutting the grass, said shoe formed with a longitudinally extending aperture, a sole provided with a forward end portion slidably extending into said aperture, a shackle adjustably connected to the rearward end of the shoe and said sole at a point spaced from the forward end thereof, said shackle being adjustable longitudinally relative to said sole, and a grassboard adjustably pivoted to the rearward end of said sole.

5. An outboard shoe and guard for a mowing machine comprising a shoe provided with a forward end portion to divide the grass to be cut from the standing grass, a dividing bar extending rearwardly from said forward end portion for turning the grass to be cut away from the standing grass, sickle means mounted on said shoe for cutting the grass, a sole connected to the front and rear end portions of said shoe and constituting ground engaging means, said dividing bar being spaced vertically above said shoe and defining with said shoe a rearwardly open air gap above and extending rearwardly from said sickle means, and a grassboard extending rearwardly from and pivotally connected to said sole.

References Cited in the file of this patent

UNITED STATES PATENTS

| Re. 6,042 | Bolander | Sept. 8, 1874 |
| 577,116 | Schuett | Feb. 16, 1897 |
| 650,889 | Abrott | June 5, 1900 |
| 1,684,886 | Rabie | Sept. 18, 1928 |
| 2,645,076 | Doonan | July 14, 1953 |
| 2,710,518 | Weaklend | June 14, 1955 |